United States Patent
Burch et al.

(10) Patent No.: US 9,401,912 B2
(45) Date of Patent: Jul. 26, 2016

(54) LATE BINDING AUTHENTICATION

(71) Applicant: NetIQ Corporation, Provo, UT (US)

(72) Inventors: Lloyd Leon Burch, Payson, UT (US); Atul Mahajan, Lehi, UT (US); Stuart Jensen, Orem, UT (US); Baha Masoud, Orem, UT (US)

(73) Assignee: NetIQ Corporation, Provo, UT (US)

( * ) Notice: Subject to any disclaimer, the term of this patent is extended or adjusted under 35 U.S.C. 154(b) by 5 days.

(21) Appl. No.: 14/512,772

(22) Filed: Oct. 13, 2014

(65) Prior Publication Data

US 2016/0105422 A1  Apr. 14, 2016

(51) Int. Cl.
*H04L 29/06* (2006.01)

(52) U.S. Cl.
CPC .................. *H04L 63/0823* (2013.01)

(58) Field of Classification Search
None
See application file for complete search history.

(56) References Cited

U.S. PATENT DOCUMENTS

| | | | |
|---|---|---|---|
| 8,060,448 B2 | 11/2011 | Jones | |
| 8,417,723 B1 * | 4/2013 | Lissack | G06F 17/3007 707/781 |
| 8,489,890 B2 | 7/2013 | Darbha et al. | |
| 8,838,501 B1 * | 9/2014 | Priebatsch | G06Q 20/40 705/26.41 |
| 2002/0062405 A1 * | 5/2002 | Ayyagari | G06F 8/61 719/331 |
| 2002/0184149 A1 * | 12/2002 | Jones | G06Q 20/105 705/41 |
| 2006/0259760 A1 | 11/2006 | Ahluwalia et al. | |
| 2009/0070266 A1 | 3/2009 | Shah et al. | |
| 2011/0030047 A1 * | 2/2011 | Gao | G06F 21/335 726/9 |
| 2012/0124658 A1 * | 5/2012 | Brudnicki | G06F 21/34 726/9 |
| 2012/0291114 A1 * | 11/2012 | Poliashenko | G06F 21/41 726/8 |
| 2013/0024919 A1 * | 1/2013 | Wetter | G06F 21/335 726/6 |
| 2014/0282993 A1 * | 9/2014 | Van Till | H04L 63/08 726/9 |
| 2014/0298441 A1 * | 10/2014 | Yamaguchi | H04L 63/0815 726/8 |
| 2015/0281225 A1 * | 10/2015 | Schoen | H04L 9/08 726/9 |

* cited by examiner

*Primary Examiner* — Christopher Revak
(74) *Attorney, Agent, or Firm* — Schwegman Lundberg & Woessner, P.A.

(57) ABSTRACT

A late-binding token (LBT) is securely generated and provided to a device application. When the LBT is presented and validated, a resource associated with the presentation is bound to the LBT and authenticated for access to a service and provided valid credentials for accessing that service.

10 Claims, 4 Drawing Sheets

LATE BINDING AUTHENTICATION

BACKGROUND

Many mobile applications from different vendors may run on a single end user's device. To protect one application from other applications, the mobile Operating System (OS) provides a sandbox for each application. The sandbox prevents direct memory access from one application to another. For example, iOS® (APPLE'S mobile OS) blocks sharing of the "KeyChain" that is used to hold credentials and other secrets, unless two applications are from a same vendor and are registered with APPLE with the same "bundle identifier (ID)." This is a good features for security but a bad for Single-Sign On (SSO) applications, because there is no secure way to pass unprotected credentials from one application to another application; so, this limits SSO applications on iOS® devices Therefore, there is a need for providing SSO capabilities on devices that attempt to control and limit the passing of credentials and secrets without comprising security on those devices.

SUMMARY

Various embodiments of the invention provide techniques for late binding authentication. In an embodiment, a method for late binding authentication is presented.

Specifically, A request is received, by a device, for authenticating a resource for access to a service. Next, a late-binding token (LBT) is generated that is associated with the request. Then, the LBT is sent to a second device associated with the resource. The resource is bound to the LBT upon receipt and validation of the LBT, where the LBT is received back from the second device. Finally, a message is communicated to the second device to indicate that the binding is completed and that the resource can now access and is now capable of authenticating to the service for access with a supplied valid authentication response.

DETAILED DESCRIPTION

Figure 1:
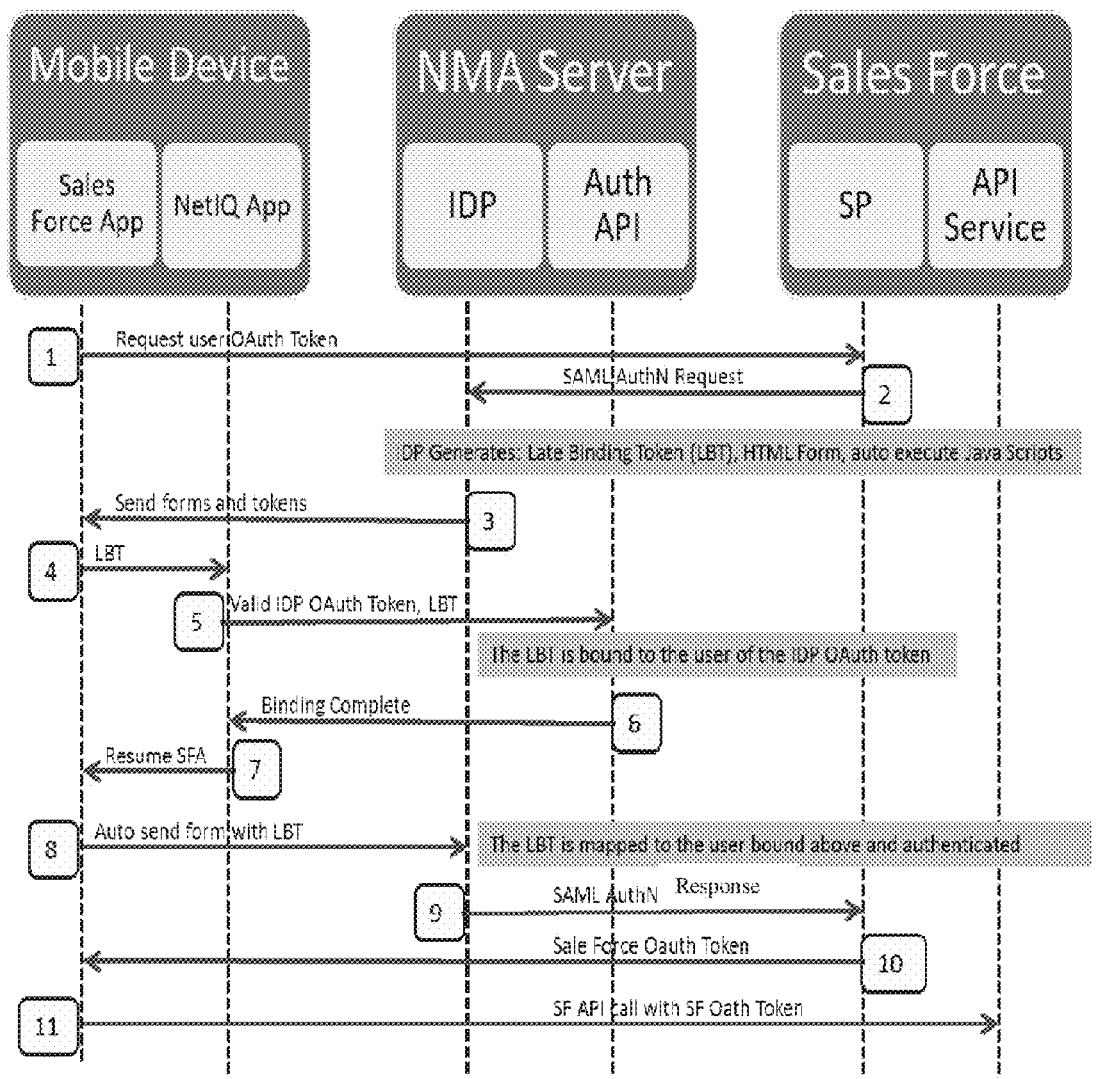
FIG. 1 is diagrams depicting interaction of some example components for late binding authentication, according to an example embodiment.

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented as enhancements within existing network architectures and network-enabled devices.

Also, the techniques presented herein are implemented in (and reside within) machines, such as processor(s) or processor-enabled devices (hardware processors). These machines are configured and programmed to specifically perform the processing of the methods and system presented herein. Moreover, the methods and system are implemented and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1-4.

FIG. 1 is diagrams depicting interaction of some example components for late binding authentication, according to an example embodiment. The FIG. 1 shows a sample processing flow and interactions between various sample applications that can be enhanced for purposes of the teachings presented herein. It is noted that other applications may be used and enhanced in the manners discussed without departing from the beneficial teachings presented herein.

The components presented are a mobile device (phone, laptop, tablet, wearable processing device, etc.), a NetIQ® Mobile Application Server (NMA), and a Sales Force™ server.

The mobile device includes a Sales Force™ mobile app (SFA) and a NetIQ® SSO mobile app ("app" refers to "application" herein). The NMA includes an Identity Provider (IDP) and an Authentication Application Programming Interface (API) referred to as Auth API. The Sales Force™ server includes a Service Provider (SP) and an API service.

It will now be discussed how late binding authentication can occur on the mobile device for purposes of SSO using a late binding authentication token, such that security is not compromised on the mobile device and such that even a mobile OS (such as iOS®) can benefit from a SSO application, such as the enhanced NetIQ® app (described below).

At 1, a user of the mobile device is using the SFA and that app needs to make an API call to the Sales Force™ API service. To do this the app must have a Sales Force™ OAuth token. So, a token request is made from the SFA though an embedded browser.

At 2, the Sales Force™ server is configured to use Security Assertion Markup Language (SAML) for purposes of authenticating users. On receipt of the OAuth token request, the embedded browser of the SFA is redirected to the NMA IDP with an SAML "AuthN Request" (Part of the SAML protocol).

Next, processing is enhanced for purposes of various embodiments of the invention presented herein and below. So, at 3, the NMA IDP builds a Late Binding Token (LBT). The LBT token can be created and built by the NMA IDP in a number of manners. As one example, consider the following: 1) a Unique Secure Random Number (USRN) is generated and large enough that it is not easily guessed by an intruder; 2) a Time-To-Live (TTL) attribute is assigned to the USRN to indicate how long the USRN is valid for use; 3) the provider ID of the requesting SP (Sales Force™ in the present example is added; 4) a relay state is include for anything that the NMA IDP wants to be returned; and 5) a Hash-based Message Authentication Code (HMAC) is generated for items 1-4 for ensuring data integrity of the LBT.

The component pieces (1-5) are combined and encrypted with a key that is known by the NMA IDP to form the LBT. At present the created LBT is without a user assignment and without user rights because a user of the mobile device is not yet known. The identity of the user and that user's rights are bound at a later point in time. This is particularly useful and beneficial as discussed herein. The USRN is prefilled into a hidden Hypertext Markup Language (HTML) form field that a JAVA script can automatically submit by the embedded browser of the SFA. HTML forms, the Java script, the LBT, and a valid OAuth token are sent to the SFA.

At 4, the HTML forms and JAVA script are executed by the SFA embedded browser, which then makes a call to the NetIQ® app and passes the NetIQ® app the LBT and the OAuth token. At this point in time, the SFA processes in the background on the mobile device and the NetIQ® app processes in the foreground on the mobile device after having been activated by the SFA.

At 5, the NetIQ® app sends the LBT to the NMA Auth API with the valid NMA IDP OAuth token.

At 6, the IDP validates the IDP OAuth token. Next, the IDP decrypts the LBT and the HMAC is independently calculated and compared with the HMAC included with the LBT. The IDP then binds the user of the mobile device and access rights for the user defined by the IDP OAuth token to the LBT and then replies with a "binding complete" message to the NetIQ® app on the mobile device.

At 7, the NetIQ app calls the SFA, which causes the SFA to process in the foreground on the mobile device.

At 8, the SFA embedded browser sends the form containing the USRN to the IDP. The USRN is matched to the user defined in the LBT, at 6, and the user is now authenticated to the IDP. Moreover, because authentication was processed with the LBT, the user does not need to re-enter his/her name and/or password for authentication.

At 9, the SFA embedded browser is redirected to the SP of the Sales Force™ server with a valid SAML AuthN response.

At 10, the SP validates the SAML AuthN response and returns a Sales Force™ OAuth token to the SFA.

At 11, the Sales Force™ OAuth token is then used to make authenticated Sales Force™ API calls to the Sales Force™ API service.

It is noted that the user of the mobile device is not prompted on the mobile device for user credentials and has access to protected resources of the Sales Force™ API service. Late binding authentication was achieved through the LBT to link the NetIQ® app session to the SFA session. So, the user authenticates once to the NMA server through the NetIQ® app and does not need to do any additional authentication for using a different service, such as the Sales Force™ service because the LBT and relevant processing described above allows SSO capabilities. This is a secure approach and is operational on OSs that restrict access to keys and credentials between competing applications within those OSs.

Moreover, the techniques for late binding authentication for purposes of secure SSO can be used within any device, authentication mechanism, and/or federation protocols. Such that, the teachings presented herein are not limited to SAML, OAuth, a mobile device, and/or a Sales Force™ application (which was shown for purposes of illustration of features that embodiments of the invention are capable of).

As demonstrated above and below, embodiments herein permit:

1) building a token that is bound at a later time to a user for purposes of late binding authentication through the LBT;

2) limiting the LBT through a TTL attribute;

3) binding the LBT to a user or an object (resource) using a variety of authentication mechanisms (OAuth, SAML, etc.) after the LBT is built;

4) using the LBT to complete a login or authentication in a SSO scenario;

5) using a browser form to hold the LBT;

6) using a single browser button to submit the LBT for authentication and binding;

7) using an auto play and/or JAVA mechanism to send the LBT at a fixed time and for a repeated interval;

8) allowing a variety of user display devices to send the LBT, such as via nodes, Ajax, and other mechanisms;

9) providing SSO capabilities on a mobile device by sharing a session from one application with that of another application, even when the OS for the mobile device does not provide such a mechanism for session sharing; and 10) securing the LBT so that it is difficult to guess, modify, or duplicate the LBT.

Figure 2:
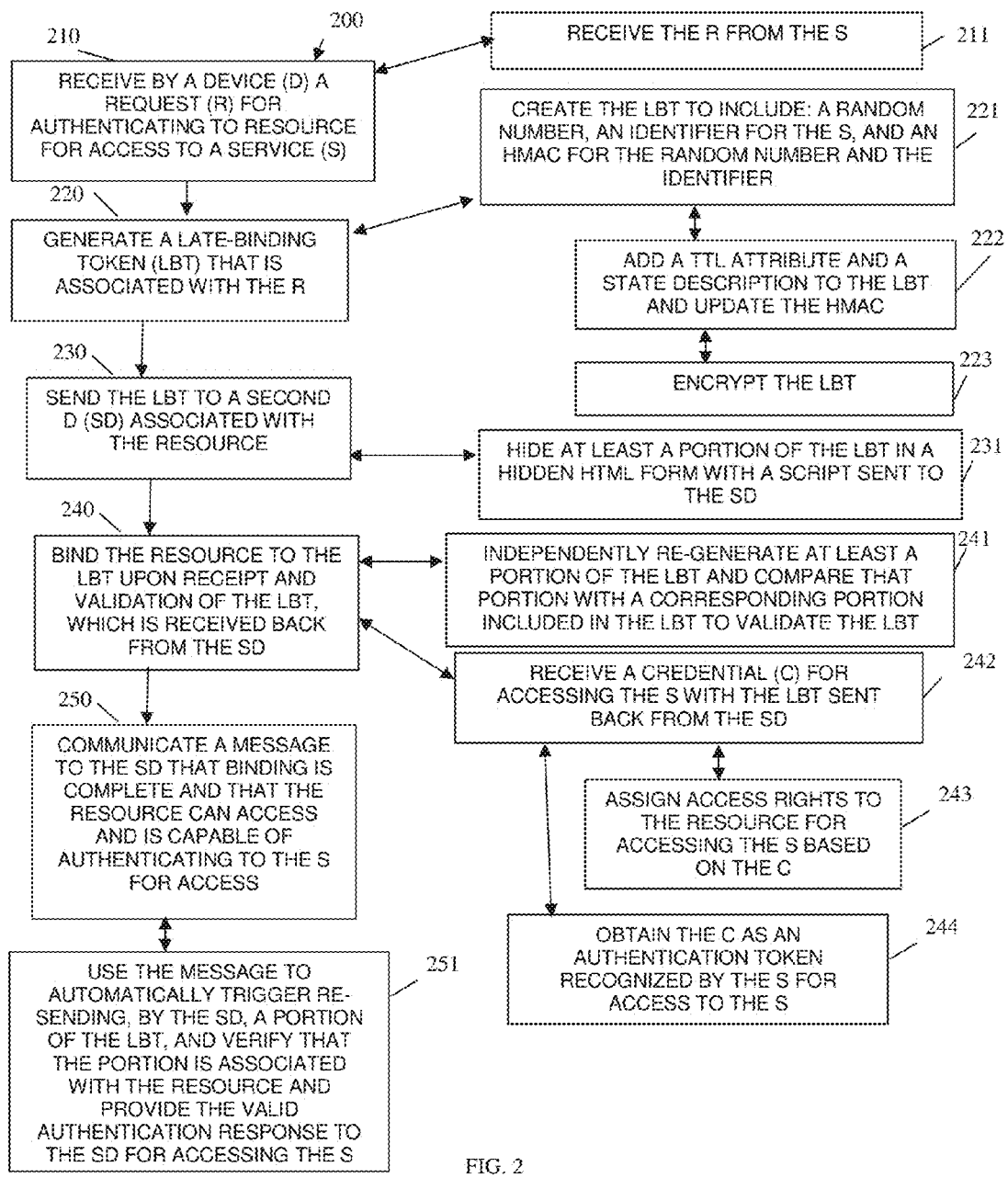
FIG. 2 is a diagram of a method for late biding authentication, according to an example embodiment.
Figure 3:
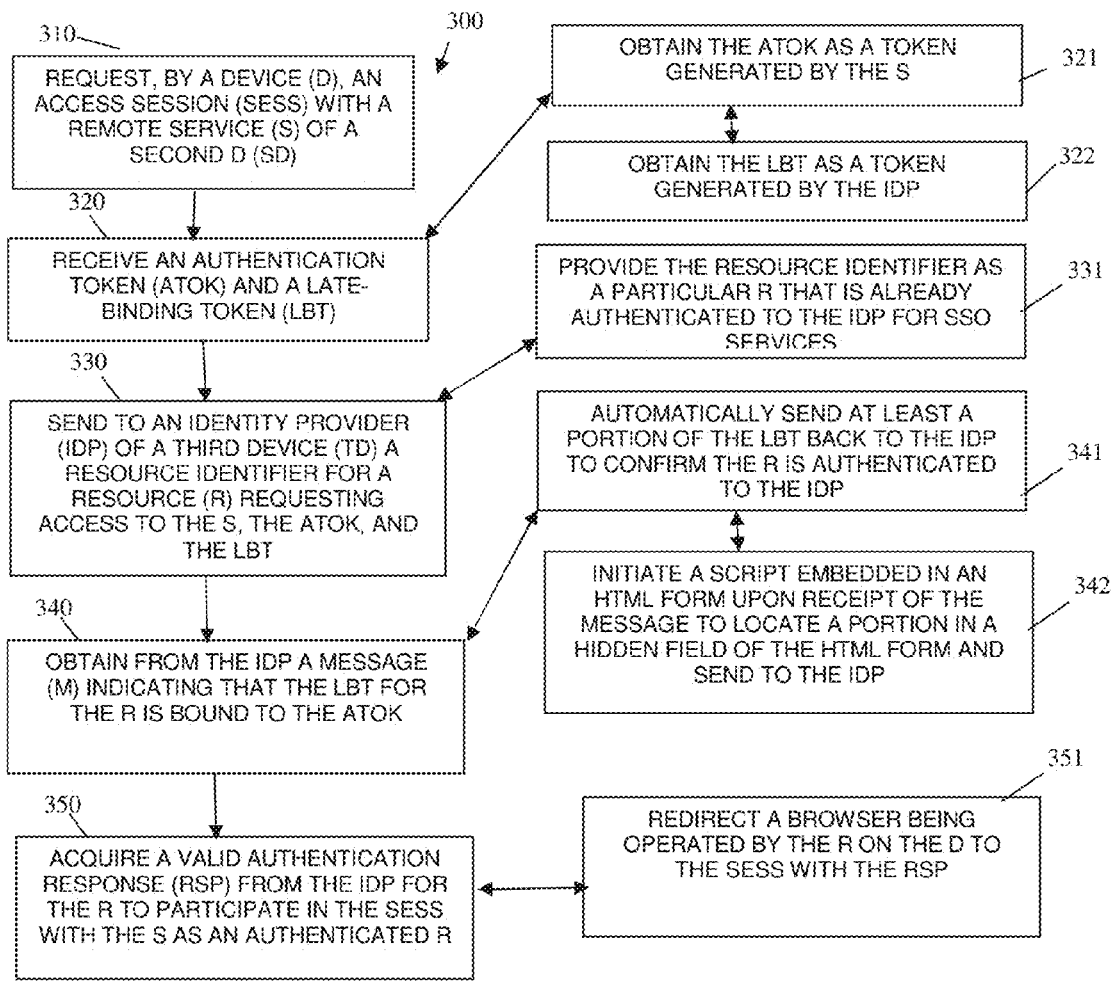
FIG. 3 is a diagram of another method for late binding authentication, according to an example embodiment.
Figure 4:
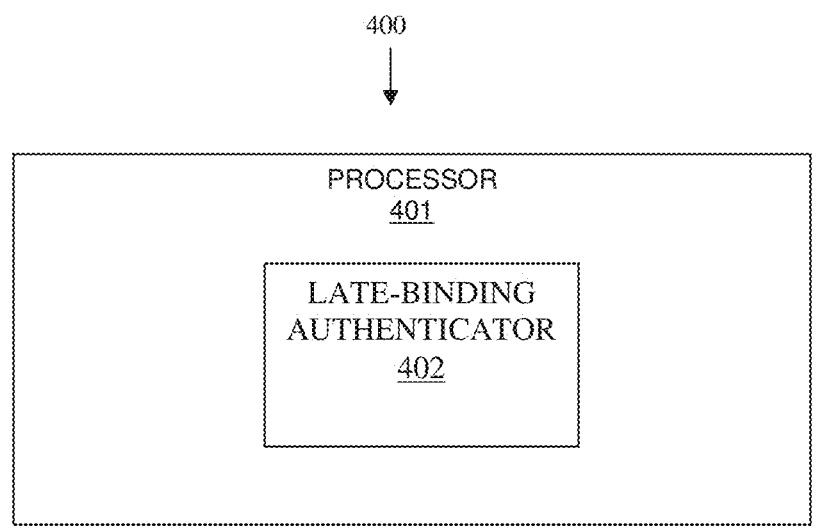
FIG. 4 is a diagram of a late binding authentication system, according to an embodiment.

Aspects of the embodiments discussed above and other embodiments are now presented with the discussion of the FIGS. 2-4.

FIG. 2 is a diagram of a method 200 for late biding authentication, according to an example embodiment. The method 200 is implemented as one or more software modules (herein after referred to as "late-binding authenticator"). The late-binding authenticator includes executable instructions that are implemented, programmed, and resides within memory and/or a non-transitory machine-readable storage media; the executable instructions execute on one or more processors of a server device and have access to one or more network connections associated with one or more networks. The networks may be wired, wireless, or a combination of wired and wireless.

In an embodiment, the late-binding authenticator processes on a server.

In an embodiment, the late-binding authenticator processes on a cloud processing environment.

In an embodiment, the late-binding authenticator interacts with one or more mobile apps on a mobile device operated by a user. The mobile device is one of: a phone, a tablet, a phablet, a laptop, a wearable processing device.

In an embodiment, the late-binding authenticator interacts with one or more application on a desktop computing device.

In an embodiment, the late-binding authenticator performs the processing of the IDP and/or the Auth API of the NMA server described above with reference to the FIG. 1.

At 210, the late-binding authenticator receives a request for authenticating a resource for access to a service. It is noted that the late-binding authenticator processed on a device, which is different from the device associated with the resource and which is different from the device associated with the service. In an embodiment, the device associated with the resource is a mobile device (phone, laptop, tablet, wearable processing device, etc.).

According to an embodiment, at 211, the late-binding authenticator receives the request from the service that the resource is attempting to obtain authenticated access to.

At 220, the late-binding authenticator generates a LBT that is associated with the request for access to the service. This was discussed in detail above with reference to the FIG. 1.

In an embodiment, at 221, the late-binding authenticator creates the LBT to include: a random number, an identifier for the service, and a HMAC produced over the random number and the identifier.

In an embodiment of 221 and at 222, the late-binding authenticator adds a TTL attribute and a state description to the LBT and then updates the HMAC to be produced over the TTL attribute and the state description with the random number and the identifier.

In an embodiment of 222 and at 223, the late-binding authenticator encrypts the LBT for added security.

At 230, the late-binding authenticator sends the LBT to a second device associated with the resource. In an embodiment, the resource is a user. In an embodiment, the resource is an automated process that executes on the second device. In an embodiment, the second device is a mobile device. In an embodiment, the second device is a desktop computing device.

According to an embodiment, at 231, the late-binding authenticator hides at least a portion of the LBT in a hidden HTML form with a script sent to the second device. In an embodiment, this is a random number associated with the LBT, as discussed above with reference to the FIG. 1.

At 240, the late-binding authenticator binds the resource to the LBT upon receive and validation of the LBT, the LBT is received back from the second device when it is ready to be used to authenticate the resource for access to the service.

In an embodiment, at 241, the late-binding authenticator independently re-generates at least a portion of the LBT and compares that portion with a corresponding portion included in the LBT to validate that the LBT was not tampered with. In an embodiment, the re-generated portion is an HMAC and the portion in the LBT is an HMAC.

In an embodiment, at 242, the late-binding authenticator receives a credential for accessing the service with the LBT that is sent back from the second device when the resource is ready to be authenticated to the service.

In an embodiment of 242 and at 243, the late-binding authenticator assigns access rights to the resource for accessing the service based on the credential.

In another embodiment of 242 and at 244, the late-binding authenticator obtains the credential as an authentication token recognized by, and, perhaps, issued by the service for access to the service.

At 250, the late-binding authenticator communicates a message to the second device that binding is complete and that the resource can access and is capable of authenticating to the service for access.

In an embodiment, at 251, the late-binding authenticator uses the message to automatically trigger re-sending, by the second device, a portion of the LBT, and verifies that the portion is associated with the resource, and further provides to the second device a valid authentication response for accessing the service when the portion is successfully verified. This scenario was discussed above with the FIG. 1 at 8 and 9.

FIG. 3 is a diagram of another method 300 for late binding authentication, according to an example embodiment. The method 300 is implemented as one or more software module (s) (herein after referred to as "SSO client agent") on a device. The SSO client agent is represented as executable instructions that are implemented, programmed, and resides within memory and/or a non-transitory machine-readable storage medium; the executable instructions execute on one or more processors of the device and have access to one or more network connections associated with one or more networks. The networks may be wired, wireless, or a combination of wired and wireless.

In an embodiment, the SSO client agent interacts with the method 200 of the FIG. 2.

In an embodiment, the SSO client agent processes on a mobile device.

In an embodiment, the SSO client agent processes on a desktop computing device.

In an embodiment, the SSO client agent at least partially performs the processing of the NetIQ® app of the FIG. 1.

At 310, the SSO client agent requests an access session with a remote service of a second device. This can be driver by a resource that is a user accessing an application on the device that executes the SSO client agent, which requires authentication of the user.

At 320, the SSO client agent receives an authentication token and a LBT.

In an embodiment, at 321, the SSO client agent obtains the authentication token as a token that was generated by the remote service.

In an embodiment of 321 and at 322, the SSO client agent obtains the LBT as a second token that is generated by an identity provider (discussed below at 330).

At 330, the SSO client agent sends to an identity provider associated with a third device: a resource identifier for a resource requesting access to the service, the authentication token, and the LBT. This is an indication that the resource of the device associated with the SSO client agent is ready to be authenticated to the remote service for access to the session with the remote service.

In an embodiment, at 331, the SSO client agent provides the resource identifier as a particular resource that is already authenticated to the identity provider from the device for SSO services.

At 340, the SSO client agent obtains from the identity provider a message indicating that the LBT for the resource is bound to the authentication token.

In an embodiment, at 341, the SSO client agent automatically sends at least a portion of the LBT back to the identity provider to confirm the resource is authenticated to the identity provider.

In an embodiment of 341 and at 342, the SSO client agent initiating a script embedded in a HTML form upon receipt of the message to locate the portion of the LBT, which is in a hidden field. The SSO client agent then sends the portion to the identity provider.

At 350, the SSO client agent acquires a valid authentication response from the identity provider for the resource to participate in the access session with the service and as an authenticated resource.

In an embodiment, at 351, the SSO client agent redirects a browser being operated by the resource on the device to the access session with the valid authentication response.

FIG. 4 is a diagram of a late binding authentication system 400, according to an embodiment. Various components of the late binding authentication system 400 are software module(s) represented as executable instructions, which are programed and/or reside within memory and/or non-transitory computer-readable storage media for execution by one or more devices. The components and the devices have access to one or more network connections over one or more networks, which are wired, wireless, or a combination of wired and wireless.

According to an embodiment, the late binding authentication system 400 implements, in whole or in part and inter alia, various features of the FIGS. 1-3. Thus, all processing discussed above with respect to the prior FIGS. are incorporated by reference herein with respect to the late binding authentication system 400 and the discussion of the FIG. 4.

The late binding authentication system 400 includes a processor 401 and a late-binding authenticator 402.

The processor 401 is part of a device that is remotely located over a network from a user-operated device (mobile or desktop computing device).

In an embodiment, the processor 401 is part of a server machine.

In an embodiment, the processor is part of a cloud machine associated with a cloud processing environment.

The late-binding authenticator 402 is adapted and configured to: execute on the processor 401 and provide authentication of a resource authenticated to the late-binding authenticator 402 with authentication credentials to a service using a LBT when the resource requests access to the resource.

In an embodiment, the late-binding authenticator 402 is the method 200 of the FIG. 2.

In an embodiment, the late-binding authenticator 402 is the IDP and/or Auth API of the NMA server of the FIG. 1.

In an embodiment, the late-binding authenticator 402 is further adapted and configured to interact with one or more applications processing on a device associated with the resource and to interact with one or more other applications processing on a second device associated with the service. The processor is on a third device that is different from the device associated with the resource and also different from the second device associated with the service.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   receiving, by a device, a request for authenticating a resource for access to a service;
   generating a late-binding token (LBT) that is associated with the request, and wherein generating further includes creating the LBT to include: a random number, an identifier for the service, and a Hashed Message Authentication Code (HMAC) for the random number and the identifier;
   sending the LBT to a second device associated with the resource;
   binding the resource to the LBT upon receipt and validation of the LBT, the LBT received back from the second device; and
   communicating a message to the second device that binding is complete and that the resource can access and is capable of authenticating to the service for access with a supplied valid authentication response.

2. The method of claim 1, wherein receiving further includes receiving the request from the service.

3. The method of claim 1, wherein creating further includes adding a Time-To-Live (TTL) attribute and a state description to the LBT and updating the HMAC to include the TTL attribute and the state description.

4. The method of claim 1 further comprising, encrypting the LBT.

5. The method of claim 1, wherein sending further includes hiding at least a portion of the LBT in a hidden Hypertext Markup Language (HTML) form with a script sent to the second device.

6. The method of claim 1, wherein binding further includes independently re-generating at least a portion of the LBT and comparing that portion with a corresponding portion included in the LBT to validate the LBT.

7. The method of claim 1, wherein binding further includes receiving a credential for accessing the service with the LBT sent back from the second device.

8. The method of claim 7, wherein receiving further includes assigning access rights to the resource for accessing the service based on the credential.

9. The method of claim 7, wherein receiving further includes obtaining the credential as an authentication token recognized by the service for access to the service.

10. The method of claim 1, wherein communicating further includes using the message to automatically trigger re-sending, by the second device, a portion of the LBT, and verifying that the portion is associated with the resource, and providing to the second device the valid authentication response for accessing the service when the portion is verified.

* * * * *